Oct. 23, 1923.

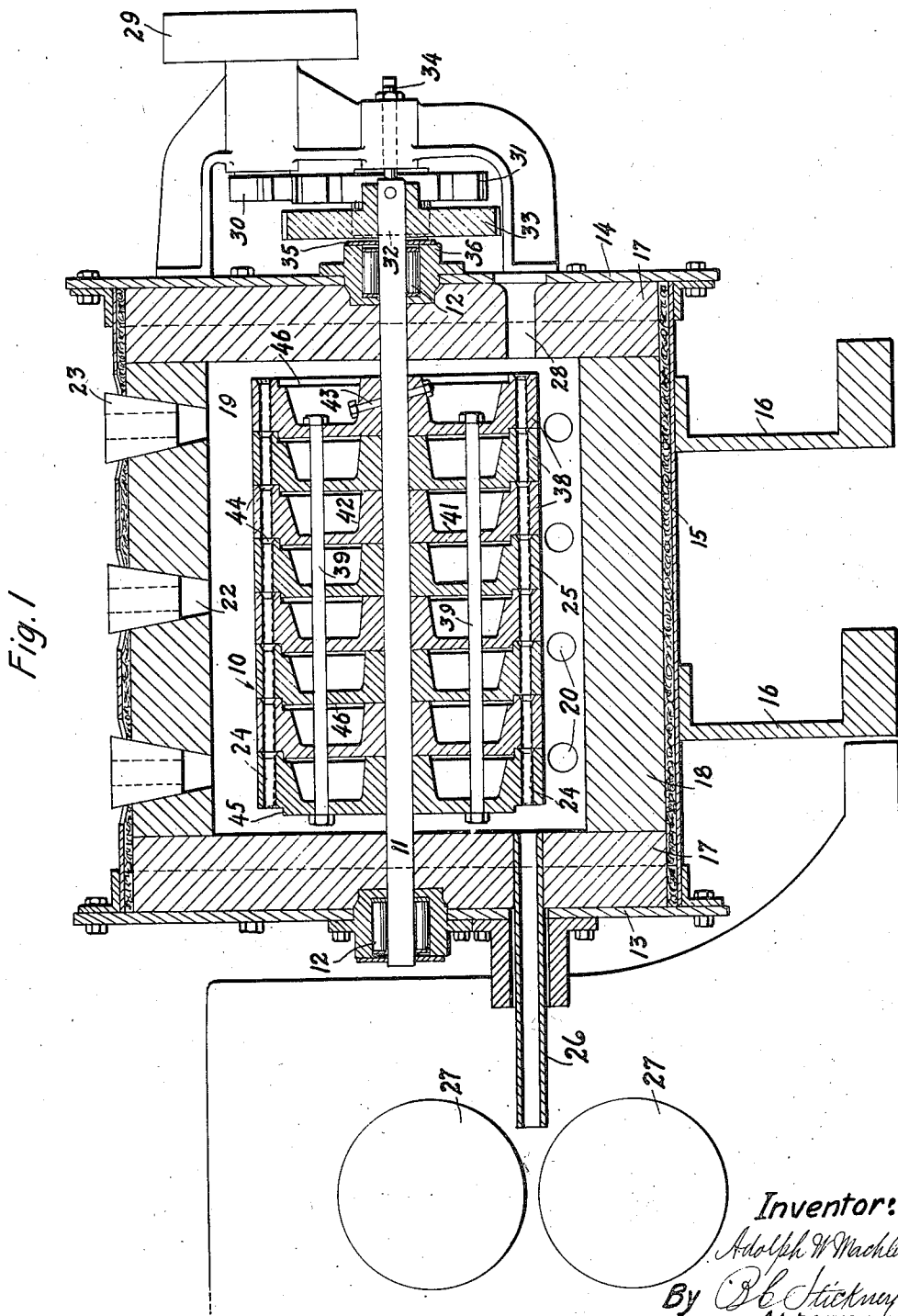

A. W. MACHLET

FURNACE

Filed Dec. 20, 1920

Inventor:
Adolph W Machlet
By D C Stickney
Attorney

Patented Oct. 23, 1923.

1,471,618

UNITED STATES PATENT OFFICE.

ADOLPH W. MACHLET, OF ELIZABETH, NEW JERSEY.,

FURNACE.

Application filed December 20, 1920. Serial No. 431,918.

*To all whom it may concern:*

Be it known that I, ADOLPH W. MACHLET, a citizen of the United States, residing in Elizabeth, in the county of Union and State of New Jersey, have invented certain new and useful Improvements in Furnaces, of which the following is a specification.

This invention relates to bringing steel and other metal rods to incandescence or high heat, for a variety of purposes, such, for example, as forging or annealing, tempering, hardening, etc.

In most cases the rods must be brought to such high heat, that the margin is very slight beyond which they will become overheated. Hence one of the difficulties found in attempting to heat rods and the like, is that there is a constant liability to unduly prolonged heating of the rods in an ordinary furnace, so that they are liable to become oxidized and covered with scale, and in some cases to adhere together or even become partly welded together. Moreover, it is difficult to get the rods heated all alike, and to heat each rod evenly throughout its length, especially in the case of a long rod.

Some of the main objects of the invention are to overcome this difficulty, and to provide for bringing rods, tools and other relatively thin, elongated articles to the right heat, while avoiding the danger of overheating; to heat each rod uniformly throughout, and to heat all rods alike; and to supply the heated rods continuously at uniform rate with but little cost for labor.

In place of piling up the rods and exposing the pile to flames in a furnace, there is provided a muffle to contain the rods, the heating of the muffle being under control and maintained at a certain point, and the heat of the rods not exceeding that of the muffle, within which they are protected from the furnace flames. Even if a rod is allowed to remain in the muffle overtime, it does not thereby become unduly heated, since in no case can it become hotter than the muffle, as the flames do not touch the rod. The muffle is provided with a multiplicity of chambers, and each chamber may be of a size to contain only one rod. No oxidation or scaling occurs. Preferably each chamber almost fits the rod; the chambers being in the form of cylindrical holes formed side by side, the muffle having the form of a barrel, and the holes extending lengthwise of the barrel and being arranged around its periphery; the arrangement resembling that of a magazine. The barrel or muffle may be mounted for revolution, so that the furnace flames may play evenly over its periphery whereby it becomes evenly heated and readily maintained at the required heat.

In using the apparatus, the muffle is heated and loaded with rods, and as soon as they are heated they are withdrawn endwise, one by one, from the successive chambers, and replaced by cold rods. The movement of the muffle may be so timed that each rod remains in the muffle just long enough to be brought to the required heat during a single revolution of the muffle. The muffle is preferably stopped to permit each rod to be discharged and a cold rod to be inserted; and hence the number of the chambers and the speed of the drum and the duration of the stops are made such that a complete revolution of the drum consumes the proper length of time for bringing a cold rod up to the required heat.

The muffle approximately fil's the flame chamber of the furnace, and the end walls of the furnace may have orifices therein for the discharge of the rods from the chambers, which have open ends; a poker or discharging device being pushed through an orifice to engage and force the heated rod out of the chamber through a discharge orifice in the other end wall of the furnace. It will be understood that the muffle is caused to stop at the proper stations so that the orifices in the end walls of the furnace will register at each stop with a chamber in the muffle. One of the end walls may also be provided with another orifice, for the introduction of a cold rod into the chamber near to that from wh'ch the heated rod is withdrawn, so that the muffle may be kept fil'ed. It will be seen that there is very little heat wasted from the furnace, since these three rod-feeding and discharging orifices are comparatively small, and the furnace walls may otherwise be whole. The invention conduces to economy, as the waste of heat is negligible, and the apparatus can be run day and night, if desired. There is nothing that has to be reheated, thus effecting a further substantial economy. The only part by which the work is carried is a device that always remains within the furnace and therefore has no opportunity to cool off, and does not require reheating.

Although the work chambers have open ends still the flames need not play upon the ends of the muffle, but only around the body thereof, and in practice no harm results from the exposed condition of the ends of the rods. The rods may be somewhat shorter than the muffle, and hence may lie entirely within the work chambers and the ends need not be unduly exposed to heat. Moreover, the ends of the muffle may be near the end walls of the furnace, to minimize the play of hot gases past the ends of the muffle.

The muffle is given a step to step rotation by suitable power-driven means, and all the rods become heated alike, each one being evenly heated throughout its length. The rods may be fed to and delivered in clean condition from the furnace rapidly, easily and continuously, at a uniform predetermined speed, and evenly heated to the required point but without liability of overheating, oxidation, scaling, welding, or sticking together. The heat of the furnace is kept at the required point automatically by means of the well-known Machlet heat controller, or otherwise, so that the muffle is always kept at the proper heat.

The muffle is made of nichrome, although the invention is not limited to this particular refractory material. The nichrome muffle is readily brought to the required heat, and there maintained, and it is durable and not liable to rapid deterioration from oxidation, etc., but remains strong while heated. The nichrome muffle is an absorber and equalizer of heat, so that it becomes practicable to heat the work very highly without danger of overheating or scaling. The solid walls of the muffle protect the work from the attack of the flames.

Since the rods or thin devices to be heated are sometimes many feet in length, the work chambers sometimes need to be a fraction of an inch in diameter and several feet in length. To overcome the difficulty of making the small holes of such great length, the muffle is preferably built up of nichrome sections, each section consisting of a rim or annulus, or a short cylindrical body, in which is formed a series of perforations, in its peripheral portion. These sections are placed together face to face, to make up the length of the muffle, the perforations being then all in line, forming together a circular row of small chambers extending around the muffle.

The muffle may revolve upon a horizontal axis, for heating long rods, as illustrated in the drawings, where the rods are shown as being fed to a pair of forging rolls; but for some purposes the muffle may be otherwise arranged, as for example, in a vertical position. In case the barrel is set vertically, a floor or plate may be arranged thereunder, upon which the ends of the rods or articles may rest. The plate may be provided with a perforation through which the rods may drop one by one, as the barrel revolves. For hardening, the barrel may be made to rotate upon a vertical axis, and the heated articles may be allowed to drop therefrom one by one into a quenching or hardening bath. Moreover, with a vertical arrangement certain portions of the rods or other articles may be left projecting above the muffle and beyond the ends of the furnace, where they will not become heated, as, for example, the shanks of drills, etc. The invention is not limited to an arrangement that requires manual ejection and feeding-in, but is capable of use with automatic feeding and ejecting devices.

Other features and advantages will hereinafter appear.

In the accompanying drawings,

Figure 1 is a longitudinal sectional elevation of means for carrying out the present invention in one form.

Figure 3:
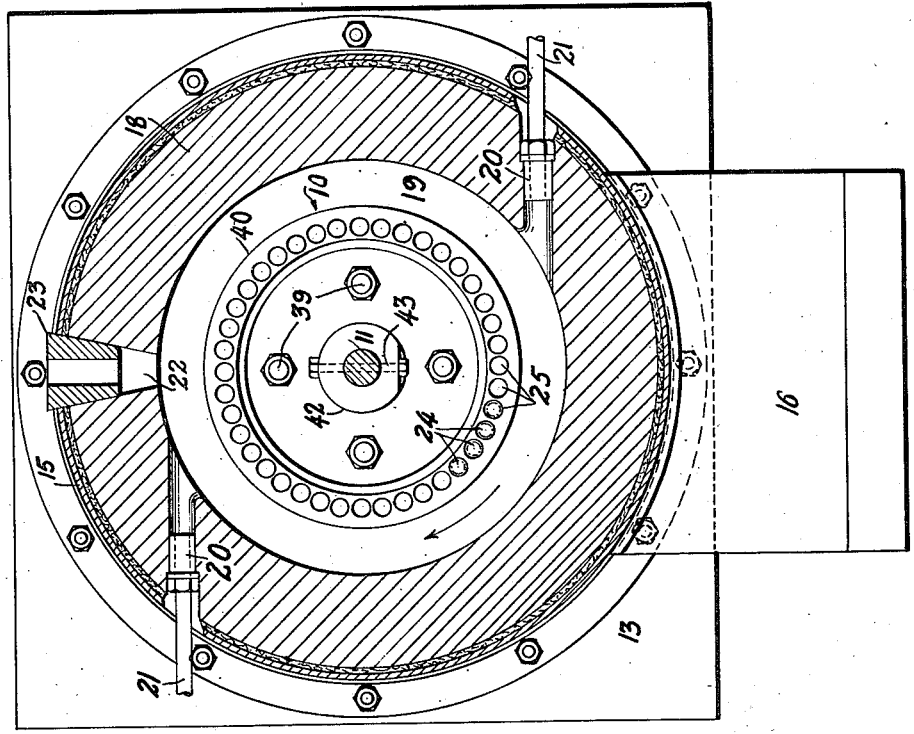
Figure 3 is a sectional end elevation of the apparatus.

The novel muffle is in the form of a barrel designated generally as 10, and mounted upon a power-driven shaft 11, which turns in roller bearings 12 provided in the end of walls 13, 14 of a furnace, which also comprises a cylindrical body portion 15 resting upon supports 16. The furnace is provided with a thick lining of refractory material, comprising end portions 17, between which extends a hollow cylindrical body portion 18, thereby completing a flame chamber 19, into which project flames from burners 20, which are fed with a mixture of compressed air and gas through pipes 21; these burners being arranged horizontally and about tangentially at the top and bottom of the flame-chamber, so that the flames are caused to circulate around the barrel 10. At the top of the furnace there may be provided vents 22, which may be closed by vented plugs 23. The work is shown in the form of rods 24, the barrel 10 serving as a magazine for a large number of rods, which lie in chambers 25 formed in the barrel, said chambers in the form of holes extending from tip to tip of the barrel and open at their ends. All of the chambers are filled except a few, including the one from which a heated rod has just been ejected through an orifice in the nature of a tubular horizontal guide 26, projecting from the end wall of the furnace, and extending towards a pair of power-driven forging rolls 27. The heated rod is ejected by inserting a tool through an orifice 28 located in the opposite end wall. The barrel is rotated intermittently, stopping with its successive chambers in line with the orifices 28, 26, to permit the heated rods to be discharged. This movement of the barrel is effected by a drive pulley 29, having a Geneva pinion 30 to mesh with a Geneva stop wheel 31, which is given one movement to each rotation of the pinion 30. The wheel 31 has a pinion 32, which meshes with a gear 33, fixed to an end of the barrel shaft 11, which projects from the furnace.

Endwise movement of the shaft to the right at Figure 1 is prevented by an adjustable screw stop 34; while movement to the left is prevented by a washer 35, placed between gear 33 and a boss 36, which carries the bearing rolls. This permits the shaft and barrel to expand slightly toward the left when heated; the shaft being free for longitudinal movement at its left-hand end.

Figure 2:
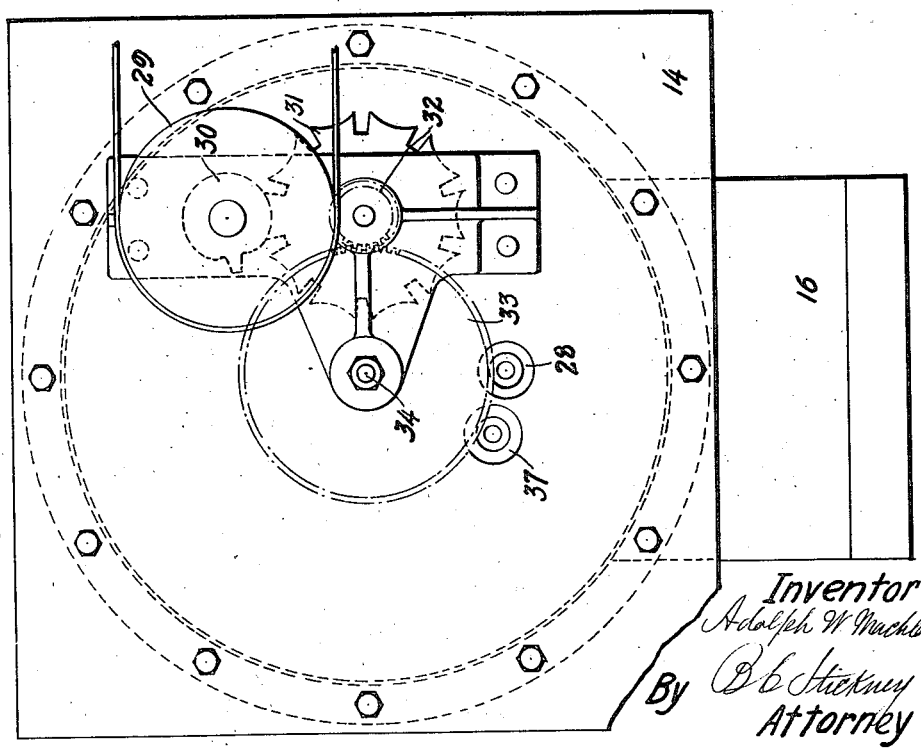
Figure 2 is an elevation of the rod-receiving end of the apparatus.

The rods may be inserted in an orifice 37, Figure 2, which is in register with another one of the work chambers in the revolving barrel. It wil be understood that the discharge chamber remains empty for two or three movements of the cylinder, or until said chamber reaches a point in register with feed opening 37, when a fresh rod is supplied; and the time which elapses until the last-mentioned rod travels around the circle and reaches a discharge position, is little if any longer than the time required for bringing said rod to the required heat.

The nichrome barrel is made of sections 38, which have circular sets of perforations 25 around their peripheries, and these sections are held together by tie-bolts 39. Each section comprises an annulus or rim portion 40, in which the perforations are formed, and a disk or web portion 41, also a hub portion 42; the sections being fitted together at their hubs and also at their rim portions. The right-hand end hub is pinned to the shaft 11 by means of a bolt 43. The right-hand end of each porforation 25 in each section is counterbored or flared out a trifle at 44, to give clearance, so that a rod may be inserted easily and without obstruction from right to left. The disk portion of each section may be shouldered (45). Where the disks join, these shoulders seat in depressions (46) formed in the adjoining disks. It will be obvious that a barrel may be constructed with fewer sections, making it shorter, or with more sections, making it longer.

In operation the furnace is heated, and then the pulley 29 is started, the barrel is revolved intermittently, and the rods are inserted one by one through the orifice 37 as the barrel stops, and ejected through the orifice 28 as soon as they reach the proper point. The machine may be kept running continuously day and night, if desired. With the muffle in level or recumbent position, the long, heavy work rods lying therein are supported by the muffle, and do not develop a tendency to warp or become deformed when heated.

Variations may be resorted to within the scope of the invention, and portions of the improvements may be used without others.

Having thus described my invention, I claim:

1. The combination with a furnace, of a multiple-chambered muffle therein mounted for rotation, and power-driven means for effecting automatic step-by-step rotation of said muffle.

2. The combination with a furnace, of a multiple-chambered muffle therein mounted for rotation, and power-driven means for effecting intermittent rotation of said muffle, said furnace having an orifice, and said intermittently rotating means connected to stop said muffle to position the chambers one by one opposite said orifice.

3. A muffle in the form of a barrel having work-chambers in its peripheral portion and provided with an axle, in combination with a furnace having a flame chamber provided with ends, said ends provided with orifices, said orifices being in line with each other, and any of the work-chambers being movable into register with said orifices to permit work to be pushed out of one orifice by means of a device inserted through the other orifice.

4. A furnace provided with a flame box containing a muffle having work-chambers which are accessible through the wall of the furnace for introducing and withdrawing work, and means outside of the flame box and extending to the interior thereof for rotating said muffle.

5. A furnace provided with a flame box having a lining of refractory material and containing a muffle having work-chambers and extending substantially from end to end of the furnace, the ends of the furnace having orifices extending through said lining, through which work may be inserted into and withdrawn from the muffle, and means outside of the flame box and extending to the interior thereof for rotating said muffle step by step, to present the work-chambers in succession to said orifices and detain them there to permit insertion and withdrawal of the work.

6. A furnace provided with a flame box containing a muffle having a series of work-chambers and extending substantially from end to end of the furnace, the ends of the furnace having orifices through which work may be inserted into and withdrawn from the muffle, and the muffle being movable to bring the work-chambers in succession to said orifices.

7. A furnace provided with a flame box containing a muffle extending substantially from end to end of the furnace, the ends of the furnace having orifices through which work may be inserted into and withdrawn from the muffle, the muffle having a series of work-chambers and being movable to bring them in succession to said orifices, said work-chambers being evenly spaced, and power-driven mechanism for imparting suitable step-by-step movements to said muffle.

8. A furnace provided with a flame box containing a muffle having a series of work-chambers and extending substantially from end to end of the furnace, the ends of the furnace having orifices through which work may be inserted into and withdrawn from the muffle, each of said chambers of such dimensions as to be approximately filled by the rod or work.

9. A furnace provided with a flame box containing a muffle having work-chambers which are accessible through the wall of the furnace for introducing and withdrawing work, said chambers being open at the ends and arranged in a circle, and said muffle being mounted for revolution.

10. A furnace provided with a flame box containing a muffle having work-chambers which are accessible through the wall of the furnace for introducing and withdrawing work, said chambers being in the form of cylindrical holes in which the work substantially fits and open at the ends and arranged in a circle, and said muffle being mounted for revolution.

11. The combination of a stationary fuel furnace having flame-restraining walls, and a muffle mounted therein for revolution, whereby the flames of the furnace may heat the muffle evenly throughout, said muffle having a series of work-chambers, said work-chambers having end openings, and provision being made for the introduction or withdrawal of work from the chambers through the flame-retaining walls of the furnace.

12. The combination of a fuel furnace, and a muffle mounted therein for revolution, whereby the flames of the furnace may heat the muffle evenly throughout, said muffle made up of a series of sections and having a series of work-chambers, said chambers in the form of cylindrical holes extending through the sections endwise of the muffle, the holes being arranged in parallelism around the peripheral portions of the sections.

13. The process of evenly and highly heating long rods or attenuated articles, comprising exposing a muffle evenly to the heat of flames in a fuel furnace by rotating the muffle, introducing the cold rods endwise into the muffle at different points, rotating the muffle and exposing it to steady heat, permitting the rods to remain in the muffle until they are brought to the required high heat, arresting the muffle at predetermined intervals, and then withdrawing the rods one after another from the muffle while arrested and replacing them by fresh rods while the muffle continues exposed to heat.

14. The combination of a stationary fuel furnace having a flame chamber, a muffle mounted in said chamber for revolution to cause the flames of the furnace to heat the muffle evenly throughout, said muffle having a series of work-chambers, and means to effect automatically step-by-step rotation of the muffle in a manner to complete a single revolution of the muffle in about the time required for heating a cold rod to the required high heat.

15. The combination of a stationary fuel furnace having a flame chamber, and a muffle mounted in said chamber for revolution to cause the flames to heat the muffle evenly throughout, said muffle having a series of work-chambers, said muffle approximately filling said flame chamber from end to end, and the furnace having flame-confining walls provided with perforations for the introduction and withdrawal of work therethrough into the muffle.

16. The process of evenly and uniformly bringing rods or attenuated articles to a predetermined degree of high heat, comprising exposing a muffle to regulated heat of flames, introducing the rods in cumbent positions to the muffle and keeping the rods separated from one another and rotating the muffle to expose it evenly to the regulated heat, and forcing out the heated rods seriatim from the muffle at one end by means of a discharging device passing into the other end of the muffle.

17. A furnace provided with a flame-box containing a muffle having work-chambers and extending substantially from end to end of the furnace, the ends of the furnace having orifices through which work may be inserted into and withdrawn from the muffle, a Geneva-gear mechanism being connected to said muffle to impart equal movements thereto for bringing the muffle chambers one after another into register with the work-feeding orifices in the furnace.

18. A furnace provided with a flame-box containing a muffle having work-chambers which are accessible through the wall of the furnace for introducing and withdrawing work, said furnace having a plurality of orifices in one wall, one for introducing the work into the muffle and the other permitting introduction through the furnace wall of a discharging rod or tool.

19. A muffle in the form of a barrel having work-chambers in its peripheral portion and provided with an axle, said muffle built up of cylindrical sections, each having a set of perforations to form portions of the work-chambers.

20. A muffle in the form of a barrel having work-chambers in its peripheral portion and provided with an axle, said muffle built up of cylindrical sections, each having a set of perforations to form portions of the work-chambers, each section comprising a rim or annulus containing the perforations, and a hub portion to support the annulus; said sections placed face to face to form a relatively long muffle.

21. A muffle in the form of a barrel having work-chambers in its peripheral portion and provided with an axle, said muffle built up of cylindrical sections, each having a set of perforations to form portions of the work-chambers, each section comprising a rim or annulus containing the perforations, and a hub portion to support the annulus; said sections placed face to face to form a relatively long muffle, and tie-bolts to fasten the sections together.

22. The process of heating rods uniformly and evenly, consisting in heating a muffle by flames and maintaining even exposure of the muffle by rotation thereof to a predetermined regulated heat while inserting the cold rods into and withdrawing the heated rods endwise from open-ended work-chambers in the muffle.

23. The combination of a furnace in the form of a hollow cylindrical body portion of refractory material, end portions of refractory material, said portions forming a flame-box, burners opening within said box, a barrel within said flame-box and mounted for revolution, and work-chambers extending from end to end of the barrel in its peripheral portion and having open ends, openings being provided in the ends of the furnace for access to the work-chambers.

24. The combination of a stationary fuel furnace, a revoluble muffle therein having a plurality of work-chambers, said furnace having an opening to afford access to the work-chambers, and a power-driven means including a Geneva-lock movement connected to said muffle to impart a step-by-step rotation to the muffle.

25. A muffle made of sections placed face to face to make up the length of the muffle, each section having holes to correspond to the other sections and to combine therewith to form work-chambers extending the length of the muffle.

26. A muffle made of sections placed face to face to make up the length of the muffle, each section having holes to correspond to the other sections and to combine therewith to form work-chambers extending the length of the muffle, and tie-rods holding said sections together.

27. A muffle made of sections placed face to face to make up the length of the muffle, each section having holes to correspond to the other sections and to combine therewith to form work-chambers extending the length of the muffle, and tie-rods holding said sections together, the holes in each section being flared or counterbored for the purpose specified.

28. A muffle made of sections placed face to face to make up the length of the muffle, each section having holes to correspond to the other sections and to combine therewith to form work-chambers extending the length of the muffle, and a furnace in which said muffle is mounted for revolution, said furnace having openings to give access to the chambers in the muffle.

29. A muffle section comprising a hub portion of nichrome, and a rim portion supported thereon and integral therewith, said rim portion having a circle of holes to cooperate with similar sections to form complete continuous work-chambers.

30. In combination, a fuel furnace having a flame chamber, a cast nichrome muffle device mounted for revolution and having a series of open-ended work-chambers cast therein.

31. In combination, a stationary fuel furnace having a flame chamber, a nichrome muffle mounted for revolution in said chamber, and having a series of open-ended work-chambers cast therein, said flame chamber having walls provided with openings through which access may be had to said work-chambers.

32. A muffle made of sections placed face to face to make up the length of the muffle, each section having holes to correspond to the other section and to combine therewith to form work-chambers extending the length of the muffle, each section having a shouldered portion to fit into a depression formed in an adjoining section.

33. In combination, a fuel furnace having a flame box provided with refractory lining, a muffle mounted within said box and having a succession of work-chambers, said muffle being in a recumbent position so as to carry the weight of the work, and opposite holes in the ends of the flame box through one of which holes a tool may be inserted to push the work out through the opposite hole.

34. In combination, a fuel furnace having a flame box provided with refractory lining, a muffle mounted within said box and having a succession of work-chambers, said muffle being in a recumbent position so as to carry the weight of the work, opposite holes in the ends of the flame box through one of which holes a tool may be inserted to push the work out through the opposite hole, and means external to the furnace and extending to said muffle to impart step-by-step rotation thereto to arrest its work-chambers in succession to register with said holes.

35. In combination, a fuel furnace having a flame box provided with refractory lining, a muffle mounted within said box and having a succession of work-chambers, said muffle being in a recumbent position so as to carry the weight of the work, opposite holes in the ends of the flame box through one of which holes a tool may be inserted to push the work out through the opposite hole, and means external to the furnace and extending to said muffle to impart step-by-step rotation thereto to arrest its work-chambers in succession to register with said holes, one of said ends having an additional hole for the insertion of work.

ADOLPH W. MACHLET.

Witnesses:
PHILIP C. OSTERMAN,
SAMUEL R. OGDEN,